US012595826B2

(12) United States Patent
Orel et al.

(10) Patent No.: US 12,595,826 B2
(45) Date of Patent: Apr. 7, 2026

(54) FREEWHEEL DEVICE AND FREEWHEEL CLUTCH

(71) Applicant: Schaeffler Technologies AG & Co. KG, Herzogenaurach (DE)

(72) Inventors: Erik Orel, Skalica (SK); Luboslav Slezák, Podbranc (SK)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 18/859,543

(22) PCT Filed: Mar. 30, 2023

(86) PCT No.: PCT/DE2023/100244
§ 371 (c)(1),
(2) Date: Oct. 24, 2024

(87) PCT Pub. No.: WO2023/208273
PCT Pub. Date: Nov. 2, 2023

(65) Prior Publication Data
US 2025/0283516 A1 Sep. 11, 2025

(30) Foreign Application Priority Data

Apr. 27, 2022 (DE) ..................... 10 2022 110 177.0

(51) Int. Cl.
F16D 41/12 (2006.01)
F16D 41/06 (2006.01)
(52) U.S. Cl.
CPC ........... F16D 41/125 (2013.01); F16D 41/06 (2013.01); F16D 41/12 (2013.01); *F16D 2041/0605* (2013.01)

(58) Field of Classification Search
CPC .................. F16D 41/06; F16D 41/061; F16D 2041/0605; F16D 41/12; F16D 41/125
See application file for complete search history.

(56) References Cited

U.S. PATENT DOCUMENTS 4,766,987 A 8/1988 Message
5,070,978 A * 12/1991 Pires ....................... F16D 41/12
192/46

(Continued)

FOREIGN PATENT DOCUMENTS

CN 113309794 A 8/2021
DE 3043706 A1 6/1981

(Continued)

*Primary Examiner* — Richard M Lorence
(74) *Attorney, Agent, or Firm* — Volpe Koenig

(57) ABSTRACT

A freewheel device having a first freewheel component and a second freewheel component which is axially coupled to the first freewheel component via an axially effective coupling device. When there is relative rotation between the first and second freewheel component in a first rotational direction, it connects the two components together for conjoint rotation and, when there is relative rotation in an opposite second rotational direction, releases the two components so that they can rotate relative to each other and which has at least one coupling element which is subjected to a spring force by means of a spring element. The spring element fixes the coupling element on the first freewheel component and specifies a tilting axis about which the coupling element can be tilted against the spring force.

8 Claims, 4 Drawing Sheets

(56)                 References Cited

U.S. PATENT DOCUMENTS 6,505,721 B1 *    1/2003    Welch ................... F16D 41/125
                                                              192/69.1
2017/0227072 A1      8/2017    Pawley et al.

FOREIGN PATENT DOCUMENTS

| | | | | | |
|---|---|---|---|---|---|
| DE | 10017743 | A1 | 10/2001 | | |
| DE | 102012205270 | A1 | 10/2012 | | |
| EP | 3404279 | A1 | 11/2018 | | |
| JP | 2001090754 | A | * | 4/2001 | ........... F16D 41/125 |
| WO | 2019176026 | A1 | 9/2019 | | |
| WO | WO-2025098558 | A1 | * | 5/2025 | ........... F16D 41/125 |

* cited by examiner

FREEWHEEL DEVICE AND FREEWHEEL CLUTCH

CROSS-REFERENCE TO RELATED APPLICATIONS

This application is the U.S. National Phase of PCT Appln. No. PCT/DE2023/100244 filed Mar. 30, 2023, which claims priority to DE 10 2022 110 177.0 filed Apr. 27, 2022, the entire disclosures of which are incorporated by reference herein.

TECHNICAL FIELD

The disclosure relates to a freewheel device. The disclosure further relates to a freewheel clutch.

BACKGROUND

EP 3 404 279 A1 describes a switchable freewheel clutch comprising a first freewheel component and a second freewheel component, which is coupled to the first freewheel component via a coupling device. The coupling device comprises a plurality of coupling elements which are acted upon by helical spring elements for rotationally engaging in the second freewheel component.

SUMMARY

The object of the present disclosure is to fix the coupling element to the first freewheel component more cost-effectively and simply. Furthermore, the spring element should be designed to be more cost-effective and space-saving and should be secured more reliably to the first freewheel component.

At least one of these objects is achieved by a freewheel device having the features described herein. This allows the coupling element to be fixed to the first rotating component in a cost-effective and simple manner and the spring element to be designed more cost-effectively.

The freewheel device can be arranged in a vehicle. The vehicle can be a motor vehicle. The freewheel device can be arranged in a drive train of the vehicle.

The freewheel device can be designed to be switchable. The coupling device can be activated or deactivated according to an axial relative position between the first freewheel component and the second freewheel component. When the coupling device is deactivated, the first freewheel component and the second freewheel component are released to rotate relative to each other regardless of the rotational direction of relative rotation.

The first freewheel component can be rotatable about an axis of rotation or can be fixed in a rotationally fixed manner. The second freewheel component can be rotatable about an axis of rotation or can be fixed in a rotationally fixed manner.

The first and/or second freewheel component can have a toothing for connection to a connecting component. The first and/or second freewheel component can transmit or support a torque. During relative rotation, the torque can be transmitted in the first rotational direction via the coupling device.

The coupling element can be made of a metal. The coupling element can be designed as a punched component. The coupling element can be punched from a sheet metal component.

In a preferred embodiment of the disclosure, it is advantageous if the coupling element for the conjoint rotation connection between the first and second freewheel components engages form-fittingly in a coupling structure in the second freewheel component. The coupling structure can have a toothing into which the coupling element releasably engages in a form-fitting manner. The toothing can be designed as an axial toothing on the second freewheel component. The axial toothing can be located directly axially opposite the coupling element.

The spring element can be designed to be mirror-symmetrical with respect to a plane of symmetry which includes an axis of symmetry running parallel to the first longitudinal axis and comprises the tilting axis as a normal. This allows the spring element to be reliably secured to the first freewheel component and to be designed cost-effectively.

A preferred embodiment of the disclosure is advantageous in which the spring element has a rectilinear first spring portion bearing against the first freewheel component and running parallel to a first longitudinal axis, and has a second spring portion protruding away from it at an angle. Preferably, the first spring portion secures the coupling element to the first freewheel component. The second spring portion can exert the spring force on the coupling element, in particular directed towards the second freewheel component.

In a particular embodiment of the disclosure, it is advantageous if the spring element is constructed in the form of a wire and the first spring portion is a rectilinear first wire portion and the second spring portion is a rectilinear second wire portion. This allows the spring element to be constructed cost-effectively and with minimal weight. The first and/or second wire portion may have a circular or other cross-section.

In a preferred embodiment of the disclosure, it is advantageous if the spring element has a fastening portion via which the spring element is fastened to the coupling element. The fastening portion can be received in a clamp-like manner on the coupling element.

In a particular embodiment of the disclosure, it is advantageous if the fastening portion adjoins the first spring portion. This allows the spring element to be made as compact as possible.

In a preferred embodiment of the disclosure, the fastening portion defines the tilting axis about which the coupling element can be deflected against the spring action of the second spring portion in a direction facing the first freewheel component. This allows both a securing of the coupling element and a tilting movement of the coupling element to be realized.

In a preferred embodiment of the disclosure, the spring element has a contact portion which bears against the coupling element for transmitting the spring force to the coupling element and is spaced apart from the fastening portion. The contact portion and the fastening portion may be spaced apart from each other with respect to the first longitudinal axis. The contact portion can be directly adjacent to the second spring portion.

In a particular embodiment of the disclosure, it is advantageous if the fastening portion is suspended as a first U-shaped portion in the coupling element and the first and second spring portions form the legs of a second U-shaped portion. This allows the installation space of the spring element to be further reduced.

Furthermore, at least one of the above-mentioned objects is achieved by a freewheel clutch for switchable torque transmission, comprising the freewheel device with at least one of the preceding features, in which the first freewheel component and the second freewheel component are connected to one another in a torque-transmitting manner during relative rotation in the first rotational direction and with which torque transmission between the first freewheel component and the second freewheel component is interrupted during relative rotation in the second rotational direction.

Further advantages and advantageous embodiments of the disclosure arise from the description of the figures and the drawings.

BRIEF DESCRIPTION OF THE DRAWINGS

The disclosure is described in detail below with reference to the drawings. In the drawings.

DETAILED DESCRIPTION

Figure 1:
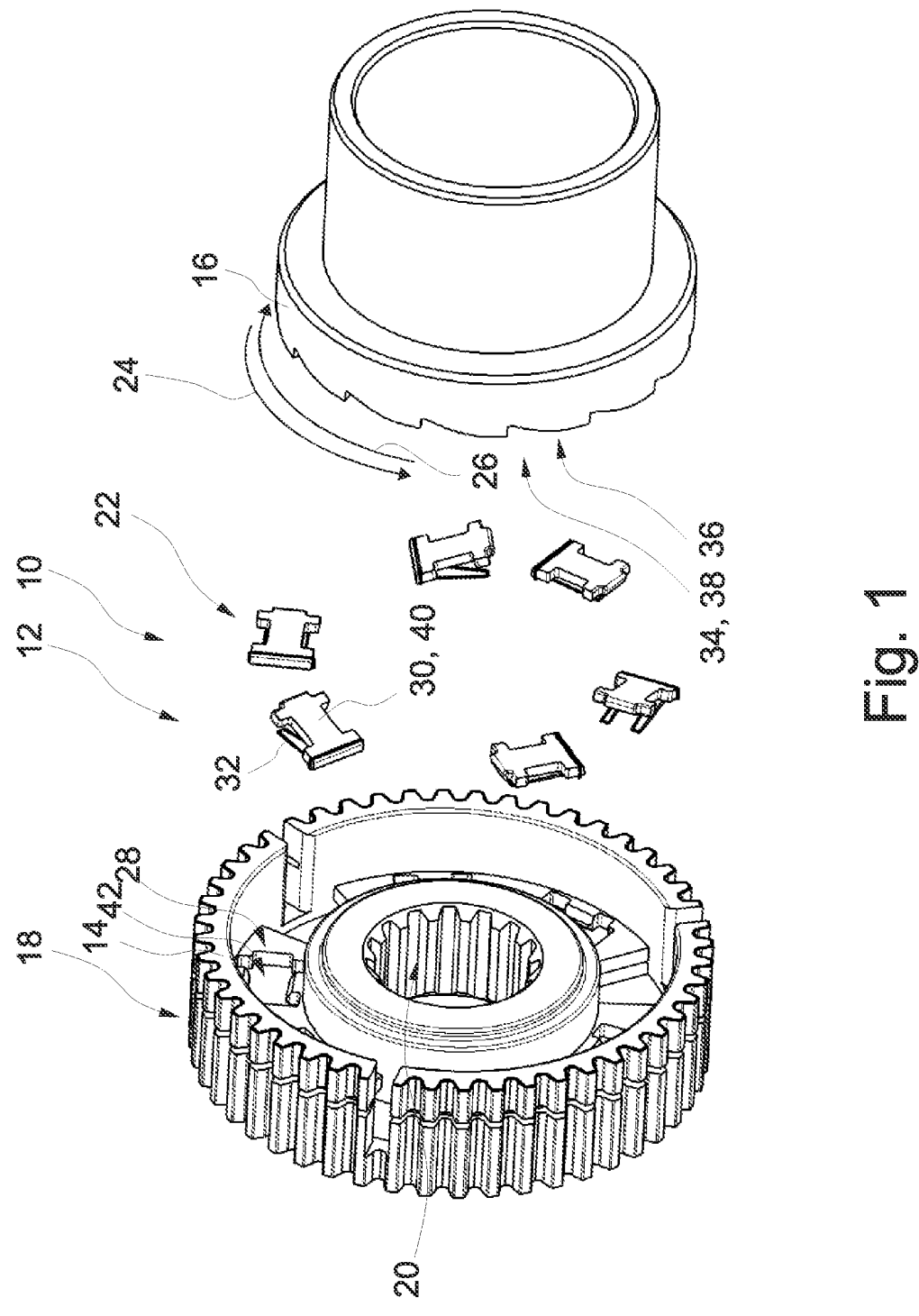
FIG. 1: shows an exploded view of a freewheel clutch in a particular embodiment of the disclosure.

FIG. 1 shows an exploded view of a freewheel clutch in a particular embodiment of the disclosure. The freewheel clutch 10 comprises a freewheel device 12 having a first freewheel component 14 and a second freewheel component 16. The first freewheel component 14 comprises an external toothing 18 for connection to a connecting element and an internal toothing 20 for connection to a shaft.

The second freewheel component 16 is coupled to the first freewheel component 14 via a coupling device 22 which, during a relative rotation between the first and second freewheel components 14, 16 in a first rotational direction 24, connects the two components together for conjoint rotation, and, during a relative rotation in an opposite second rotational direction 26, releases the two components to rotate relative to each other. The freewheel device 12 can be designed to be switchable in that the first and second freewheel components 14, 16 are axially movable relative to each other. The coupling device 22 is activated or deactivated according to the relative axial position between the first and second freewheel components 14, 16. When the coupling device 22 is deactivated, the first and second freewheel components 14, 16 are released to rotate relative to each other regardless of the rotational direction 24, 26.

The coupling device 22 comprises a plurality of coupling elements 30 which are arranged circumferentially distributed on an axial side 28 of the first freewheel component 14 and on each of which a spring force acts via a spring element 32. The coupling device 22 further comprises a coupling structure 34 on an axial side 36 of the second freewheel component 16 axially opposite the axial side 28 of the first freewheel component 14. The coupling structure 34 is designed as an axial toothing 38, into which the coupling elements 30 engage form-fittingly during relative rotation in the first rotational direction 24.

The coupling elements 30 are preferably designed as snap-in bodies 40 which, supported by the spring force of the spring elements 32, engage form-fittingly in the coupling structure 34 of the second freewheel component 16 for the conjoint rotation connection between the first and second freewheel components 14, 16 and are fastened in openings 42 in the first freewheel component 14.

Figure 2:
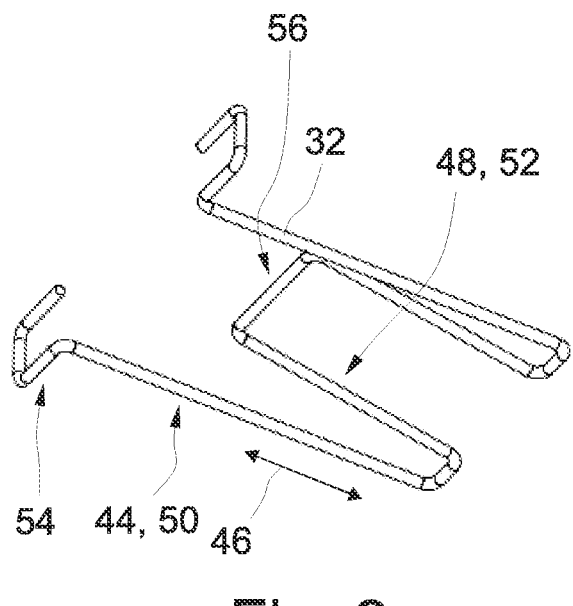
FIG. 2: shows a three-dimensional view of the spring element from FIG. 1.

FIG. 2 shows a three-dimensional view of the spring element from FIG. 1. The spring element 32 is designed in the form of a wire, comprising a first spring portion 44, which bears against the first freewheel component and which runs parallel to a first longitudinal axis 46 in a straight line, and has a rectilinear second spring portion 48 protruding at an angle therefrom. The first spring portion 44 is designed as a rectilinear first wire portion 50 and the second spring portion 48 is designed as a rectilinear second wire portion 52.

The first spring portion 44 is followed by a fastening portion 54 which fastens the spring element 32 to the coupling element. The fastening portion 54 extends directly from the first spring portion 44, while the second spring portion 48 merges into a contact portion 56 which bears against the coupling element and is spaced apart from the fastening portion 54 with respect to the first longitudinal axis 46.

Figure 3:
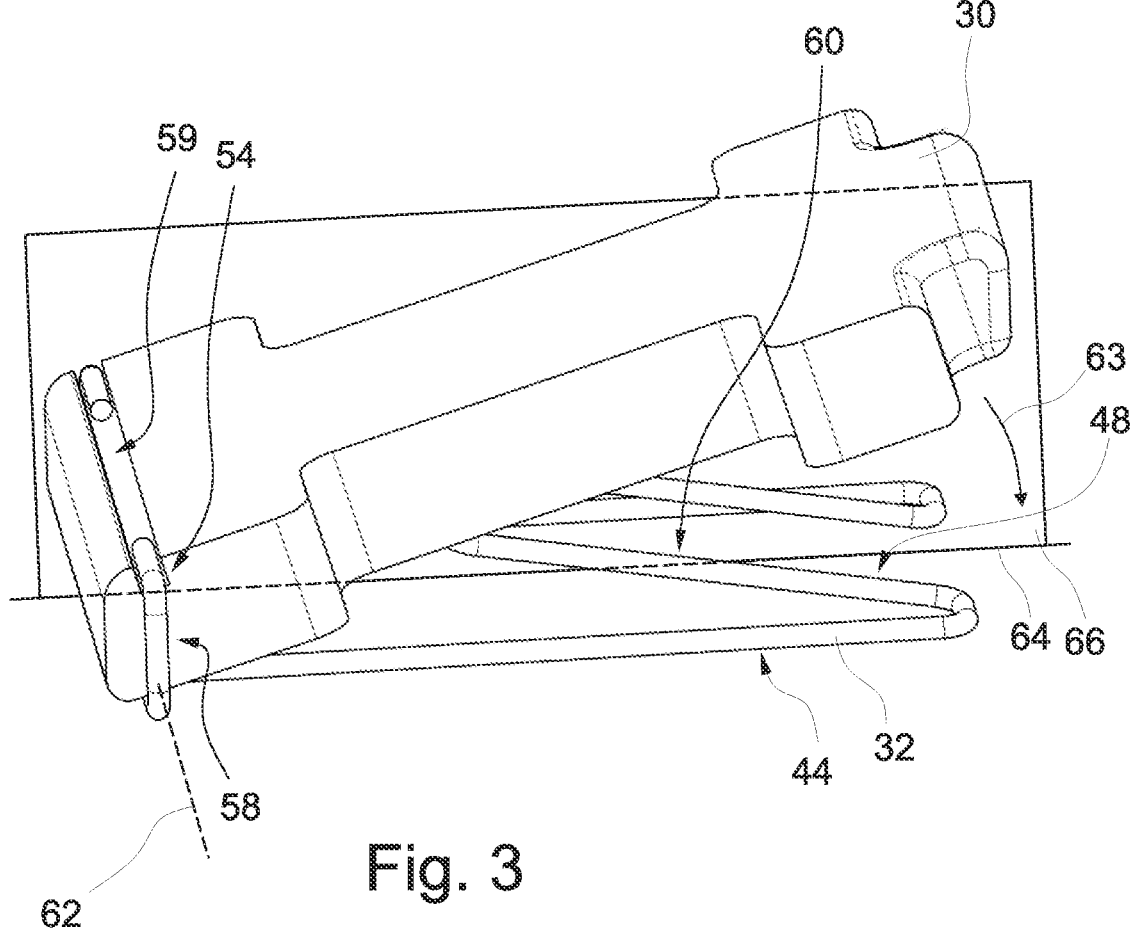
FIG. 3: shows a three-dimensional view of the spring element and the coupling element from FIG. 1.

FIG. 3 shows a three-dimensional view of the spring element and the coupling element from FIG. 1. The spring element 32 is pre-installed on the coupling element 30, preferably clipped in. The spring element 32 and the coupling element 30 form a pre-installation assembly. The fastening portion 54 is suspended as a first U-shaped portion 58 in a groove 59 in the coupling element 30. The first and second spring portions 44, 48 form the legs of a second U-shaped portion 60. The second spring portion 48 extends at an angle relative to the first spring portion 44.

The fastening portion 54 defines a tilting axis 62 about which the coupling element 30 can be deflected counter to the spring action of the second spring portion 48 in a direction 63 facing the first freewheel component. The second spring portion 48 bends downwards in the direction of the first freewheel component.

The angle of inclination of the second spring portion 44 defines the inclination of the coupling element 30 about the tilting axis 62.

The spring element 32 is designed to be mirror-symmetrical with respect to a plane of symmetry 66 which includes an axis of symmetry 64 running parallel to the first longitudinal axis 46 and comprises the tilting axis 62 as a normal.

Figure 4:
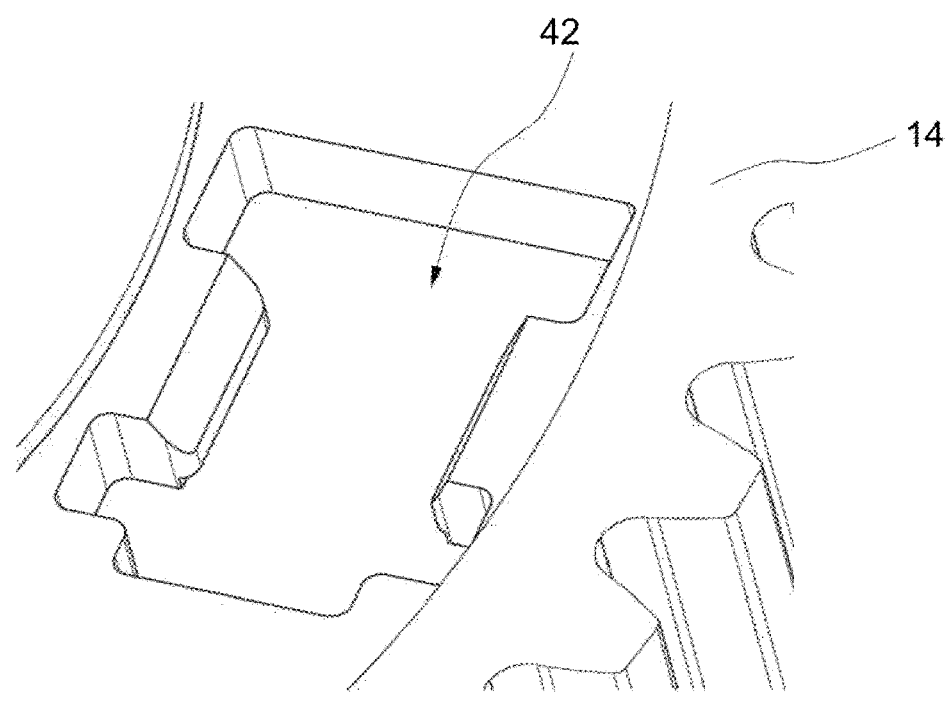
FIG. 4: shows a detail of a three-dimensional view of the first freewheel component from FIG. 1.

FIG. 4 shows a detail of a three-dimensional view of the first freewheel component from FIG. 1. The first freewheel component 14 has the opening 42 for receiving the coupling element. The contour of the opening 42 is matched to the contour of the coupling element. As a result, the stability of the first freewheel component 14 can be increased and the first freewheel component 14 can be designed to be lighter and more space-saving.

Figure 5:
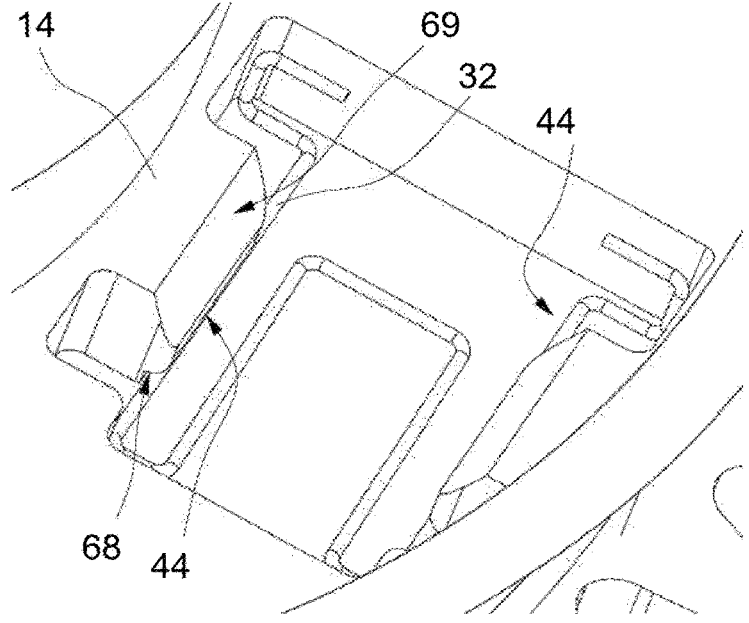
FIG. 5: shows a detail of a three-dimensional view of the first freewheel component and the spring element from FIG. 1.

FIG. 5 shows a detail of a three-dimensional view of the first freewheel component and the spring element from FIG. 1. The first freewheel component 14 accommodates the spring element 32. For this purpose, the first spring portion 44 is suspended in a shoulder 68 of the first freewheel component 14 and thus the spring element 32 is fastened to the first freewheel component 14. The spring element 32 can be released from the first freewheel component 14 by pressing the two opposite first spring portions 44 towards each other and thus the first spring portion 44 can be removed from the shoulder 68.

The first freewheel component 14 has a ramp 69 by which the first spring portion 44 is compressed and the spring element 32 can be easily inserted.

5

Figure 6:
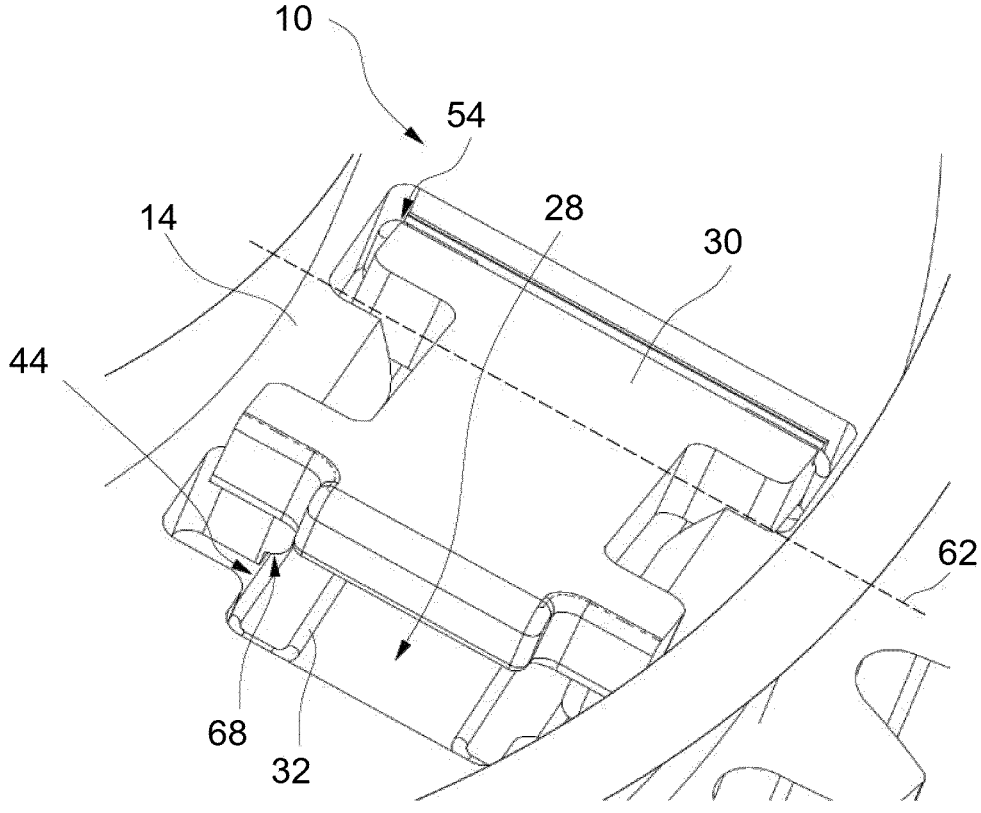
FIG. 6: shows a detail of a three-dimensional view of the freewheel clutch from FIG. 1.

FIG. 6 shows a detail of a three-dimensional view of the freewheel clutch from FIG. 1. The freewheel clutch 10 comprises the first freewheel component 14, the coupling element 30 and the spring element 32 which fastens said coupling element to the first freewheel component 14. The coupling element 30 is fixed to the first freewheel component 14 via the spring element 32. The fastening portion 54 secures the spring element 32 to the coupling element 30 and the first spring portion 44 is suspended in the shoulder 68 of the first freewheel component 14. The coupling element 30 is arranged inclined relative to the first freewheel component 14 and can be tilted against the spring force of the spring element 32 toward the first freewheel component 14 about the tilting axis 62 defined by the fastening portion 54.

The coupling element 30 protrudes axially from the axial side 28 of the first freewheel component 14 due to the inclined arrangement and can thus engage form-fittingly in the coupling structure of the second freewheel component.

LIST OF REFERENCE SIGNS

10 Freewheel clutch
12 Freewheel device
14 First freewheel component
16 Second freewheel component
18 External toothing
20 Internal toothing
22 Coupling device
24 First rotational direction
26 Second rotational direction
28 Axial side
30 Coupling element
32 Spring element
34 Coupling structure
36 Axial side
38 Axial toothing
40 Snap-in body
42 Opening
44 First spring portion
46 First longitudinal axis
48 Second spring portion
50 First wire portion
52 Second wire portion
54 Fastening portion
56 Contact portion
58 Portion
59 Groove
60 Portion
62 Tilting axis
63 Direction
64 Axis of symmetry
66 Plane of symmetry
68 Shoulder
69 Ramp

The invention claimed is:

1. A freewheel device having
a first freewheel component,
a second freewheel component, which is axially coupled to the first freewheel component via an axially effective coupling device, which, when there is relative rotation between the first and second freewheel components in a first rotational direction, connects the first and second freewheel components together for conjoint rotation and, when there is relative rotation in an opposite second rotational direction, releases the first and second freewheel components so that they can rotate relative to each other and which has at least one coupling element which is subjected to a spring force by a spring element,
wherein the spring element fixes the coupling element on the one hand to the first freewheel component and on the other hand defines a tilting axis about which the coupling element can be tilted against the spring force;
wherein the spring element has a rectilinear first spring portion bearing against the first freewheel component and running parallel to a first longitudinal axis and has a second spring portion protruding at an angle therefrom;
wherein the spring element has a fastening portion, via which the spring element is fastened to the coupling element;
wherein the first spring portion and at least a portion of the fastening portion are coplanar; and
wherein the second spring portion extends towards the fastening portion.

2. The freewheel device according to claim 1, wherein the coupling element for conjoint rotation connection between the first and second freewheel components engages form-fittingly in a coupling structure in the second freewheel component.

3. The freewheel device according to claim 1, wherein the spring element is constructed in the form of a wire and the first spring portion is a rectilinear first wire portion and the second spring portion is a rectilinear second wire portion.

4. The freewheel device according to claim 1, wherein the fastening portion adjoins the first spring portion.

5. The freewheel device according to claim 1, wherein the fastening portion defines the tilting axis about which the coupling element can be deflected against a spring action of the second spring portion in a direction facing the first freewheel component.

6. The freewheel device according to claim 1, wherein the spring element has a contact portion which bears against the coupling element for transmitting the spring force to the coupling element and is spaced apart from the fastening portion.

7. The freewheel device according to claim 1, wherein the fastening portion is suspended as a first U-shaped portion in the coupling element and the first and second spring portions form legs of a second U-shaped portion.

8. A freewheel clutch for switchable torque transmission, comprising the freewheel device according to claim 1, in which the first freewheel component and the second freewheel component are connected to one another in a torque-transmitting manner during relative rotation in the first rotational direction, and with which a torque transmission between the first and second freewheel components is interrupted during relative rotation in the second rotational direction.

* * * * *